United States Patent
Bergqvist

(10) Patent No.: US 11,472,695 B2
(45) Date of Patent: Oct. 18, 2022

(54) CONTROLLING MAINTENANCE OF A FUEL DISPENSER

(71) Applicant: Wayne Fueling Systems LLC, Austin, TX (US)

(72) Inventor: Anders Bergqvist, Kanor (SE)

(73) Assignee: Wayne Fueling Systems LLC, Austin, TX (US)

( * ) Notice: Subject to any disclaimer, the term of this patent is extended or adjusted under 35 U.S.C. 154(b) by 841 days.

(21) Appl. No.: 15/801,947

(22) Filed: Nov. 2, 2017

(65) Prior Publication Data

US 2019/0127209 A1    May 2, 2019

(51) Int. Cl.

| | |
|---|---|
| *G06F 7/04* | (2006.01) |
| *B67D 7/08* | (2010.01) |
| *G05B 19/042* | (2006.01) |
| *G06F 21/57* | (2013.01) |
| *G06F 21/44* | (2013.01) |
| *B67D 7/04* | (2010.01) |

(52) U.S. Cl.
CPC ......... *B67D 7/085* (2013.01); *G05B 19/0426* (2013.01); *G06F 21/44* (2013.01); *G06F 21/57* (2013.01); *B67D 7/04* (2013.01); *G05B 2219/24001* (2013.01); *G05B 2219/24167* (2013.01)

(58) Field of Classification Search
CPC ...... B67D 7/085; B67D 7/04; G05B 19/0426; G05B 2219/24167; G05B 2219/24001; G06F 21/57; G06F 21/44
USPC .......................................................... 726/2
See application file for complete search history.

(56) References Cited

U.S. PATENT DOCUMENTS 5,790,410 A * 8/1998 Warn ................... G06Q 20/363
235/381
6,185,307 B1 * 2/2001 Johnson, Jr. ......... G06Q 20/027
380/270

(Continued)

FOREIGN PATENT DOCUMENTS

| CN | 1293797 A | 5/2001 |
|---|---|---|
| CN | 101450781 A | 6/2009 |

(Continued)

OTHER PUBLICATIONS

"Extended European Search Report received in European Patent Application No. 18200922.5", dated Mar. 27, 2019, 9 pages.

(Continued)

*Primary Examiner* — Amare F Tabor
(74) *Attorney, Agent, or Firm* — Mintz Levin Cohn Ferris Glovsky and Popeo, PC; Lisa Adams

(57) ABSTRACT

Systems and methods are provided for controlling maintenance of a fuel dispenser. In one exemplary embodiment, a system is provided having a fuel dispenser that includes an electronics module having a data processor, a remote enterprise server in communication with the electronics module, and a remote code processor in communication with the remote enterprise server. The data processor is configured to determine an authorization password based on data characterizing the fuel dispenser, to receive a remote password that is generated by the remote code processor based on the fuel dispenser data, to determine that the remote password matches the authorization password, and to cause the fuel dispenser to enter a maintenance mode.

21 Claims, 4 Drawing Sheets

(56) References Cited

U.S. PATENT DOCUMENTS

| | | | |
|---|---|---|---|
| 6,470,288 B1 | 10/2002 | Keidel et al. | |
| 6,871,230 B1* | 3/2005 | Fukunaga | H04L 63/083 709/223 |
| 7,617,523 B2* | 11/2009 | Das | G06F 21/41 380/1 |
| 7,636,840 B2* | 12/2009 | Tang | G06Q 20/02 380/259 |
| 8,225,102 B1* | 7/2012 | Palmer | G06F 21/31 340/5.54 |
| 8,667,296 B1* | 3/2014 | Bilinski | G06F 21/46 713/184 |
| 9,942,221 B2* | 4/2018 | Valecha | H04L 63/083 |
| 10,202,271 B2* | 2/2019 | Walsh | B67D 7/78 |
| 2003/0200108 A1* | 10/2003 | Malnoe | B67D 7/246 705/16 |
| 2008/0263672 A1* | 10/2008 | Chen | G06F 21/83 726/26 |
| 2013/0276528 A1* | 10/2013 | Hakansson | B67D 7/18 73/195 |
| 2015/0360932 A1 | 12/2015 | Bergqvist | |
| 2016/0016783 A1* | 1/2016 | Rubin-Ayma | B67D 7/3245 141/94 |
| 2017/0308965 A1* | 10/2017 | Morris | B67D 7/04 |

FOREIGN PATENT DOCUMENTS

| | | |
|---|---|---|
| CN | 101562600 A | 10/2009 |
| CN | 101645775 A | 2/2010 |
| EP | 3480719 A1 | 5/2019 |
| WO | 9948066 A1 | 9/1999 |

OTHER PUBLICATIONS

Menezes et al. (Oct. 1, 1996) "Handbook of Applied Cryptography", CRC Press, pp. 385-424.

\* cited by examiner

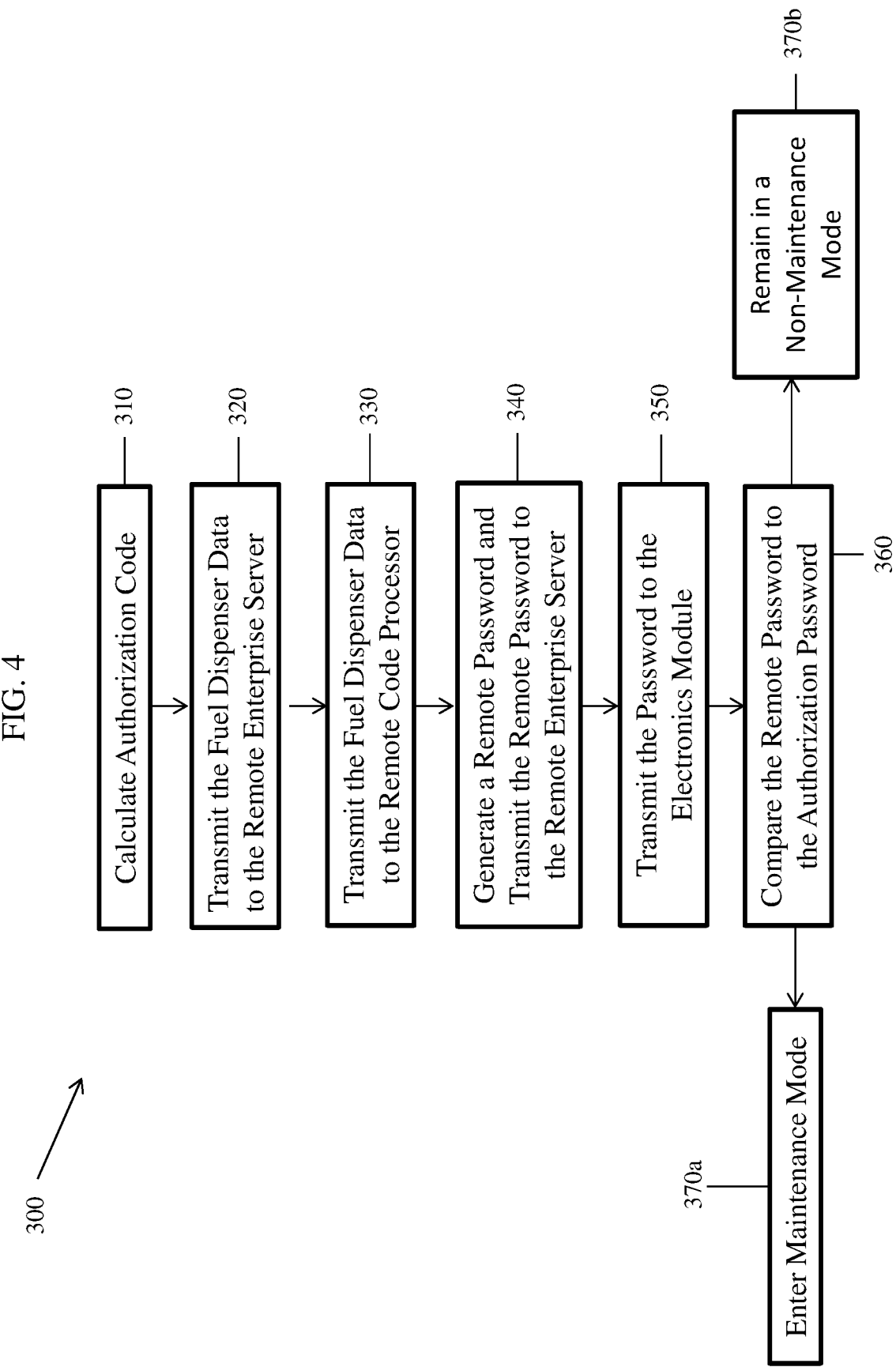

CONTROLLING MAINTENANCE OF A FUEL DISPENSER

FIELD

Systems and methods are provided for controlling maintenance of fuel dispensers.

BACKGROUND

The retail petroleum industry utilizes various types of fuel dispensers for dispensing fuel to customers. Due to high usage rates and time, the fuel dispensers can be subject to deterioration, which can result in higher operational costs and lower service quality. In order to maintain fuel dispensers in suitable operational condition, preventive maintenance, including software updates to the fuel dispenser system, is performed.

Generally, in order to update the software of a fuel dispenser and/or determine whether corrective maintenance may be required, the fuel dispenser must be in a maintenance mode. An on-site operator is typically needed to attend to the fuel dispenser in order to prompt the fuel dispenser to enter maintenance mode to thereby gain access and enable system updates and/or service of the fuel dispenser. The need for on-site operators, however, has its disadvantages. For example, operators may find it challenging to attend to fuel dispensers that are located in remote locations, which can make it difficult to perform software updates to and/or service such fuel dispensers.

Accordingly, despite existing technologies, there remains a need for improved systems and method for controlling maintenance of fuel dispensers.

SUMMARY

Systems and methods are provided for controlling access to a maintenance mode on a fuel dispenser.

In one exemplary embodiment, a system is provided and can include a fuel dispenser having a housing with fuel dispensing components, such as pumps and meters, disposed therein. The system can also include an electronics module disposed at least partially therein, the electronics module including a data processor that can be configured to determine an authorization password based on data characterizing the fuel dispenser, to receive a remote password, to determine that the remote password matches the authorization password, and to cause the fuel dispenser to enter a maintenance mode.

In certain exemplary embodiments, the system can include a remote enterprise server in communication with the electronics module. The remote enterprise server can be configured to prompt the electronics module for the fuel dispensing data and to receive the fuel dispensing data. The system can also include a remote code processor in communication with the enterprise server. The remote code processor can be configured to receive the fuel dispensing data from the enterprise server, to determine the remote password based on the received data, and to provide the remote password to the enterprise server. The remote enterprise server can be configured to provide the remote password to the electronics module of the fuel dispenser.

The fuel dispenser can vary in a number of ways. For example, in one aspect, the electronics module can be adapted to prevent the fuel dispenser from entering maintenance mode prior to the data processor determining that the remote password matches the authorization password. In another aspect, the electronics module can be adapted to receive a request and to cause the fuel dispenser to exit the maintenance mode.

In some aspects, the remote enterprise server can be configured to receive a command from an external source, and to request that the electronics module provide the fuel dispenser data. In such aspects, the electronics module can provide different fuel dispenser data for each request received. In other aspects, the remote enterprise server can be configured to prompt the fuel dispenser for the fuel dispensing data at the expiration of a predetermined time period. In another aspect, the remote enterprise server can be configured to transmit instructions to the electronics module to cause the electronics module to perform at least one maintenance operation on the fuel dispenser during the maintenance mode.

In another aspect, the fuel dispenser data can include a challenge code and identity information of a central processing unit (CPU) of the electronics module.

In another exemplary embodiment, a process system is provided and can include a data processing unit that can be configured to be at least partially housed in a fuel dispenser and that can be configured to generate and transmit data characterizing the fuel dispenser and to determine an authorization password based on the fuel dispenser data. The system can also include a remote enterprise server that can be configured to receive a command to prompt the data processing unit to provide the fuel dispenser data, and that can be configured to transmit a request to the data processing unit for the fuel dispenser data and to receive the fuel dispenser data. The system can further include a remote code processor that can be configured to receive the fuel dispenser data from the enterprise server, calculate a remote password based on the received fuel dispenser data, and provide the remote password to the enterprise server, where the enterprise server can be configured to receive the remote password and provide the remote password to the data processing unit. The data processing unit can be configured to determine whether the remote password matches the authorization password, and to enter a maintenance mode if the remote password matches the authorization password.

The data processing unit can vary in a number of ways. For example, in some aspects, the remote enterprise server can be configured to transmit instructions to the data processing unit to cause the data processing unit to perform at least one maintenance operation on a fuel dispenser during the maintenance mode. In other aspects, when the data processing unit determines that the remote password matches the authorization password, the data processing unit can be configured to cause the fuel dispenser to enter a maintenance mode. In another aspect, the data processing unit can be configured to provide different fuel dispenser data for each request received. In one aspect, the data processing unit can be configured to prevent a fuel dispenser from entering a maintenance mode prior to the data processor determining that the remote password matches the authorization password. In another aspect, the data processing unit can be configured to receive a request and to cause a fuel dispenser to exit the maintenance mode.

In some aspects, the fuel dispenser data can include a challenge code and identity information of a central processing unit (CPU) of the data processing unit.

Methods for prompting a maintenance mode of a fuel dispenser are also provided. In one embodiment, the method can include calculating, by an electronics module comprising a data processor and that is at least partially housed in a fuel dispenser, an authorization password based on data characterizing the fuel dispenser. The electronics module can transmit the fuel dispenser data to an enterprise server that is in communication with the electronics module. The enterprise server can receive and transmit the fuel dispenser data to a code processor that is in communication with the enterprise server. The code processor can generate and transmit a remote password based on the received fuel dispenser data to the enterprise server. The enterprise server can receive and transmit the remote password to the electronics module, and the data processor can determine that the remote password matches the authorization password and can cause the fuel dispenser to enter the maintenance mode.

In some aspects, the method can include generating, by the electronics module, the fuel dispensing data that includes a challenge code and identity information of a central processing unit (CPU) board of the electronics module. In other aspects, the method can include receiving, by the electronics module, data comprising a request from the enterprise server to provide the fuel dispenser data.

In one aspect, the method can include prompting, by the enterprise server, the fuel dispenser for the fuel dispensing data at the expiration of a predetermined time period. In another aspect, the method can include performing one or more maintenance operations on the fuel dispenser during the maintenance mode.

Non-transitory computer program products (e.g., physically embodied computer program products) are provided that store instructions, which when executed by one or more data processors of one or more computing systems, causes at least one data processor to perform operations herein. Similarly, computer systems are also provided that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

BRIEF DESCRIPTION OF DRAWINGS

This invention will be more fully understood from the following detailed description taken in conjunction with the accompanying drawings, in which:

FIG. 4 is a process flow diagram illustrating an exemplary embodiment of a method for prompting a maintenance mode of a fuel dispenser.

DETAILED DESCRIPTION

Figure 1:
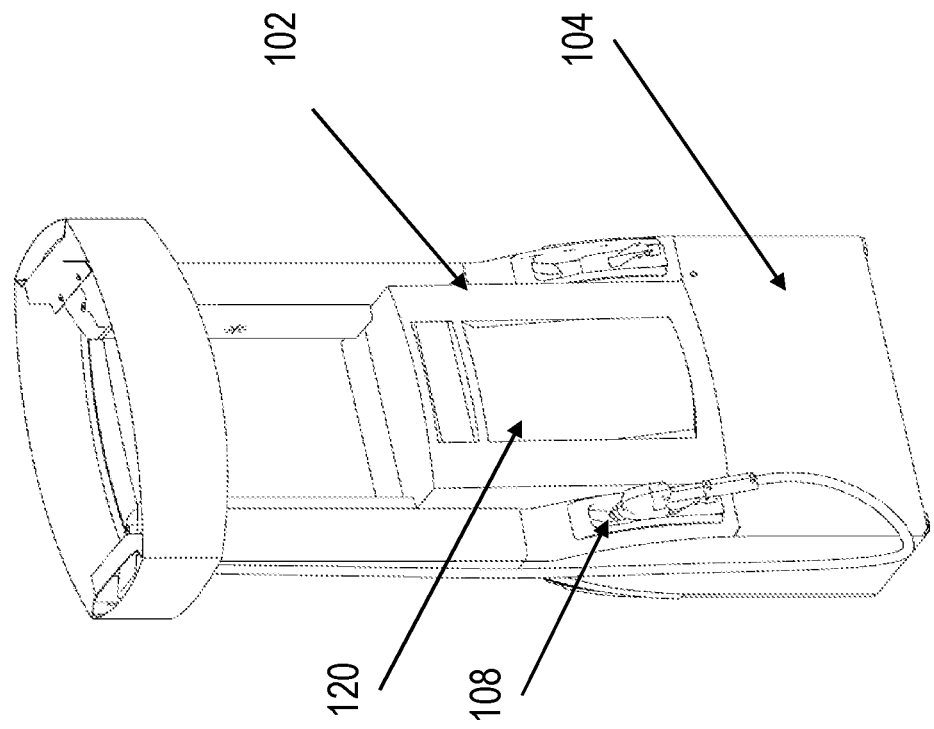
FIG. 1 is a perspective view of one exemplary embodiment of a fuel dispenser.
Figure 1:
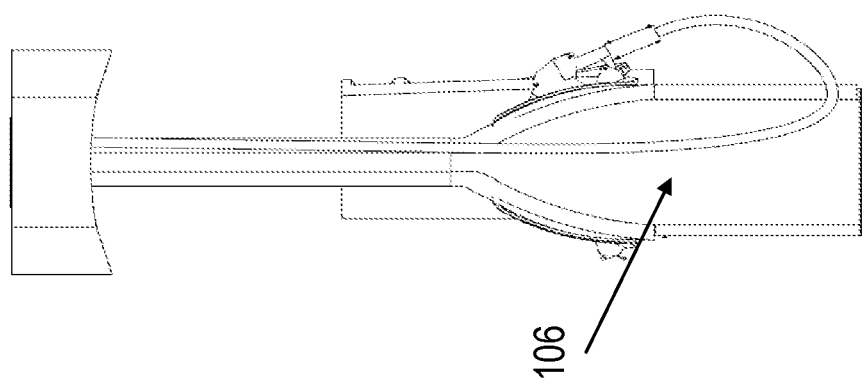

Various exemplary systems and methods are provided for controlling maintenance of a fuel dispenser. A typical fuel dispenser generally includes an electronics compartment that houses various electronics for operating the fuel dispenser. The electronics compartment can include a memory having stored data, such as various software programs, and one or more data processors for processing the software and controlling operation of the fuel dispenser. It is often necessary to perform upgrades and/or modifications to the software programs, however it is important that access to the stored data be carefully controlled. This can be achieved by only enabling updates and/or modifications when the system is in a maintenance mode. Accordingly, systems and methods are provided herein for controlling access to the maintenance mode. In general, a fuel dispenser can have a data processor that stores data characterizing the fuel dispenser. This data can be used by the fuel dispenser to generate an authentication password. This same data can also be used by a remote enterprise server that is in communication with the fuel dispenser to obtain a remote password. In certain exemplary embodiments, the remote enterprise server can provide the data characterizing the fuel dispenser to a remote code processor, which can use the data to generate the remote password. The remote password can be communicated back to the remote enterprise server, which in turn can communicate this information to the data processor in the fuel dispenser. If the data processor on the fuel dispenser determines that the authentication password and the remote password match, the data processor can cause or allow the fuel dispenser to enter a maintenance mode, thereby allowing maintenance operations, such as software updates, to be performed on the fuel dispenser. The communication between the fuel dispenser, the remote enterprise server, and the remote code processor can be direct, e.g., without the need for on-site operator. In particular, the fuel dispenser being configured to directly communicate with the remote enterprise server can allow the fuel dispenser to be prompted for and provide necessary data to enter a maintenance mode even when there is no operator on-site, however an operator may be present and could request entry to maintenance mode.

An exemplary system can include a variety of features to facilitate local or remote triggering of a fuel dispenser to enter a maintenance mode, as described herein and illustrated in the drawings. However, a person skilled in the art will appreciate that the system can include only some of these features and/or it can include a variety of other features known in the art. The systems and methods described herein are merely intended to represent certain exemplary embodiments.

Figure 2:
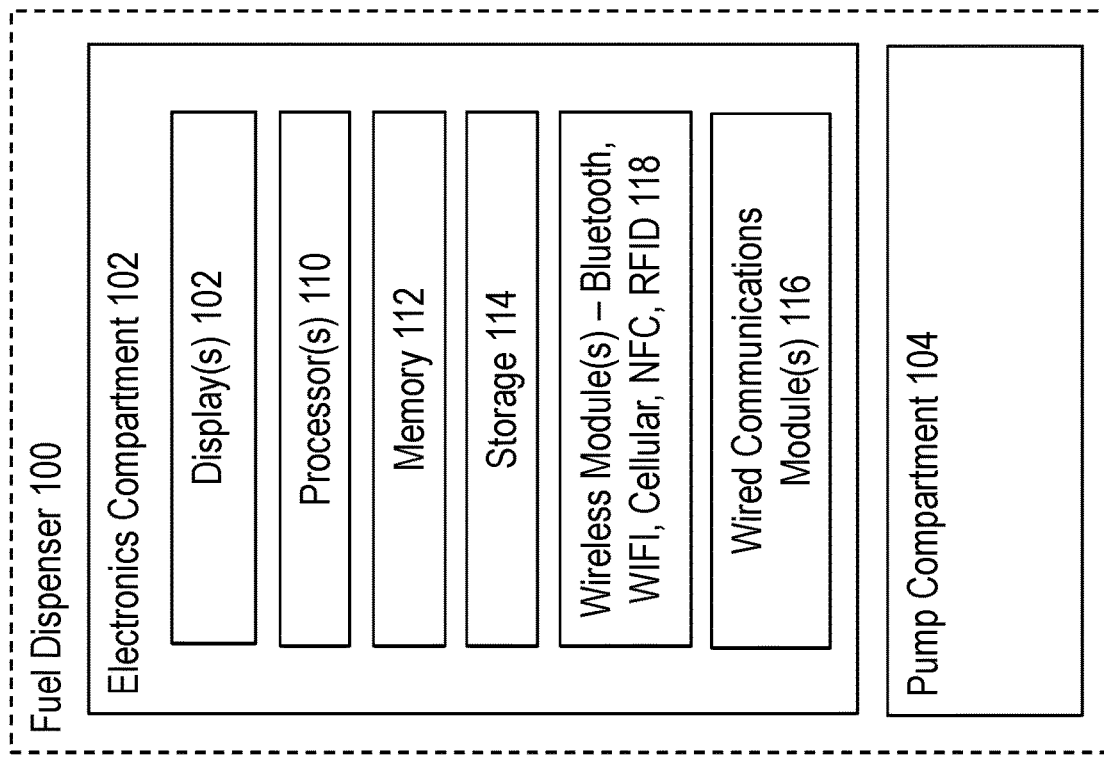
FIG. 2 is a block diagram illustrating the components of the fuel dispenser shown in FIG. 1.

FIG. 1 illustrates one embodiment of a fuel dispenser 100 that can be implemented within fuel dispensing systems such as those described herein, and FIG. 2 illustrates components of the fuel dispenser 100. In general, the fuel dispenser 100 includes an electronics compartment 102 and a pump compartment 104, collectively referred to herein as a housing. The pump compartment 104 houses one or more pumps configured to pump one or more types of fuel from a fuel tank or other reservoir, and it has therein one or more motors for driving the pumps. The pump compartment 104 can include other components to facilitate fuel dispensing and mixing, such as fuel meters configured to monitor fuel flow, valves, a strainer/filtering system, a vapor recovery system, and the like. The pump compartment 104 is isolated from the electronics compartment 102 within the fuel dispenser 100 to facilitate safety, security, and/or maintenance, as will be appreciated by a person skilled in the art. Fuel is thus not allowed to flow from the pump compartment 104 to the electronics compartment 102 and instead flows from the pump compartment 104 through hoses 106 to nozzles 108 for dispensing. As will be appreciated by a person skilled in the art, the nozzles 108 are each configured to dispense fuel from the fuel dispenser 100 as pumped therefrom by the pump.

The electronics compartment 102 houses electronics for facilitating payment for fuel and for facilitating the dispensing of the fuel. The electronics include, for example, a fuel controller that, at least in some implementations includes a processor 110, memory 112, and storage 114, and that is configured to control dispensing of the fuel from the pump compartment. The electronics compartment also includes a payment terminal that is configured to receive payment information from a user, and transmit and receive payment data, for example with a point-of-sale (POS) system. The electronics compartment in some dispensers can include one or more communication units 116, 118 configured to transmit and receive wired and/or wireless communications. The electronics compartment can also include a display 120. The display 120 can include a touchscreen which can be configured to show information (e.g., media content, payment information, etc.) and receive input thereon, and a memory configured to store data therein. The payment terminal (e.g., a card reader, and the like) can be integrated into the display for processing customer payment information. Only the display 120 is shown in FIG. 1. Similar components can be located on the other side of the electronics compartment 102. A person skilled in the art will appreciate that the fuel dispenser of FIG. 1 is only one example of a fuel dispenser, and that any fuel dispenser known in the art can be used with the systems and methods disclosed herein.

Figure 3:
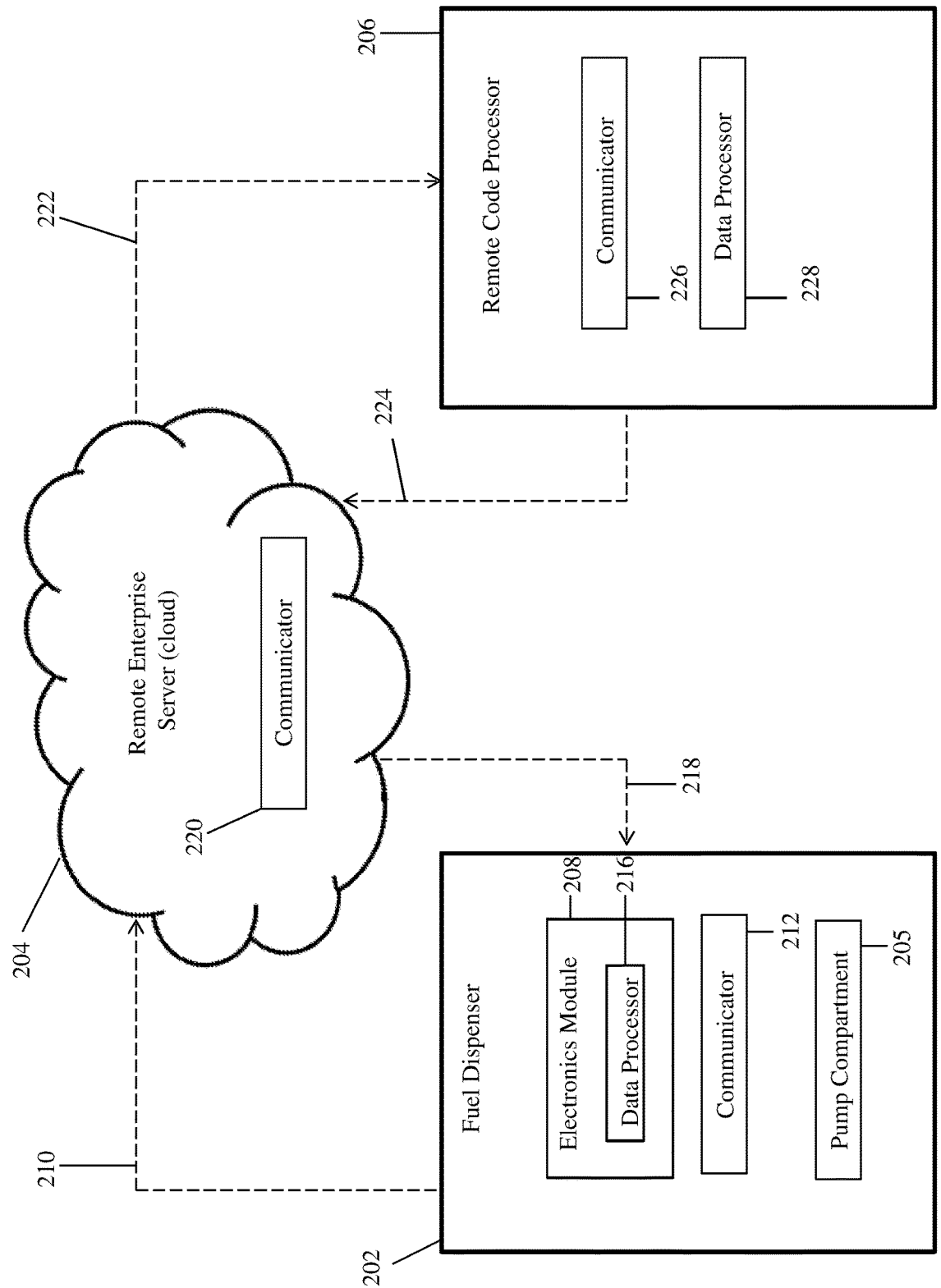
FIG. 3 is a block diagram illustrating an exemplary embodiment of a system for controlling maintenance of a fuel dispenser.

FIG. 3 is a block diagram illustrating one embodiment of a system that is configured to control the maintenance of a fuel dispenser. In general, the system 200 includes a fuel dispenser 202, a remote enterprise server 204, and a remote code processor 206. The remote enterprise server 204 is in direct communication with each of the fuel dispenser 202 and the remote code processor 206. In this exemplary embodiment, the remote enterprise server 204 is illustrated as a cloud network.

While the fuel dispenser 202 can have a variety of configurations, as shown in FIG. 3, the fuel dispenser 202 generally includes, an electronics module 208 and a pump compartment 205, like pump compartment 104 in FIG. 2. The electronics module 208 can be configured to directly communicate with the remote enterprise server 204 via a communication link 210. The fuel dispenser 202 can also include a communicator 212 configured to facilitate communication over a communication link 210.

While the electronics module 208 can include any number of components configured to facilitate data processing, in some embodiments, the electronics module 208 includes a data processor 216. It is contemplated that the data processor 216 can include one or more processors forming part of at least one computing system. While the data processor 216 can be configured for various operations, in one exemplary embodiment, the data processor 216 can be configured to determine an authorization password based on data characterizing the fuel dispenser 202. The data characterizing the fuel dispenser 202 can be, for example, a challenge code and identity information of a central processing unit (CPU) of the electronics module 208. This data can be programmed into the electronics module 208 during manufacturing of the fuel dispenser 202, or in other embodiments it can be determined when a request to enter maintenance mode is initiated or received. In other embodiments, the electronics module 208 can be configured to provide different fuel dispenser data for each request received. In order to determine the authorization password, the data processor 216 can have a particular stored algorithm that can use the data characterizing the fuel dispenser 202 to calculate the authorization password. The data processor 216 can also be configured to receive a remote password from the remote enterprise server 204, and to determine whether the remote password matches the authorization password. The remote enterprise server 204 can obtain the remote password from the remote code processor 206. In particular, the remote enterprise server 204 can obtain the data characterizing the fuel dispenser 202 from the data processor 216 via communication link 210, and it can send the data characterizing the fuel dispenser 202 to the remote code processor 206 via communication link 222. The remote code processor 206 can have the same particular stored algorithm, and it can use the data characterizing the fuel dispenser 202 to calculate the remote password. That is, even though the data processor 216 calculates the authorization password and the remote code processor 206 calculates the remote password, the same mathematical procedure or formula is being used to determine the passwords. Once the data processor 216 calculates the authorization password, and receives the calculated remote password from the remote code processor 206 via the remote enterprise server 204, as described in more detail below, the data processor 216 can determine if the passwords match. If the passwords do match, the data processor can cause the fuel dispenser 202 to enter a maintenance mode. If the data processor 216 determines that the remote password does not match the authorization password, the data processor can prevent the fuel dispenser 202 from entering a maintenance mode.

The data processor 216 can include any type of microprocessor or central processing unit (CPU), including programmable general-purpose or special-purpose microprocessors and/or any of a variety of proprietary or commercially-available single or multi-processor systems. The computing system can also include a memory, which provides temporary or permanent storage for computer-executable instructions to be executed by the processor or for data that is processed by the processor. The various elements of the computing system can be coupled to one another, such as with a bus system.

In some embodiments, the electronics module 208 can be configured to prevent the fuel dispenser 202 from entering maintenance mode prior to the data processor 216 determining that the remote password matches the authorization password. The data processor 216 can be configured to receive a request from an on-site operator or from the remote enterprise server to enter maintenance mode. In particular, in one embodiment, an on-site operator can connect to the electronics module 208 on the fuel dispenser 202, i.e., using a keypad or other interface on the dispenser, using a remote control that communicates with the dispenser 203, or through a TCP/IP or USB connection. In another embodiment, the data processor 216 can receive a request from the remote enterprise server 204 to enter maintenance mode. Regardless of where the request comes from, once a request is received, the data processor 216 can begin the process described above to determine whether a remote password received from the remote enterprise server 204 matches an authorization password.

The data processor 116 can also be configured to cause the fuel dispenser 202 to exit maintenance mode based on various triggers. For example, in one embodiment the electronics module 208 can be adapted to receive a request and to cause the fuel dispenser 202 to exit the maintenance mode. The request can be provided, for example, by an external source (i.e., a source external to the system 200, such as a human operator), or by the remote enterprise server 204. By way of non-limiting example, the remote enterprise server 204 can perform maintenance operations on the fuel dispenser 202, such as upgrading the software in the electronics module 208. Once the maintenance operations are complete, the data processor 216 can receive a notification from the remote enterprise server 204 thereby causing the data processor 216 to exit the maintenance mode. In another embodiment, the data processor 216 can be configured to exit the maintenance mode after a pre-determined time period, or after an operator onsite indicates that maintenance is complete.

In order for the data processor 216 to communicate with the remote enterprise server 204, the communication over the communication link 210 between the fuel dispenser 202 and the remote enterprise server 204 can be over a network (e.g. the Internet, a wireless wide area network, a local area network, a wide area network, or the like). As will be appreciated by a person skilled in the art, the communication link 210 can include a single communication link or a plurality of interconnected communication links.

The communicator 212 can have a variety of configurations. In certain aspects, the communication link 210 can be wireless, which can facilitate remote location of the enterprise server 204 from the fuel dispenser 202. The communicator 212 can accordingly be configured to facilitate wireless communication over the communication link 210 and can include, e.g., a transceiver communicating via any of a variety of wireless techniques, e.g., Bluetooth protocol, cellular protocol, WIFI protocol, near field communication (NFC), a radio frequency identification (RFID) protocol, etc. Any of a variety of types of wireless connectivity hardware can be used for the wireless connectivity, as will be appreciated by a person skilled in the art. The wireless communication can be according to any of a variety of communication protocols, e.g., TCP/IP, etc., as will also be appreciated by a person skilled in the art. The wireless connectivity may facilitate wireless mesh network communication, as will be appreciated by a person skilled in the art. The types of wireless connectivity that the communicator 212 includes can be chosen by an owner of the fuel dispenser 202 according to the owner's current fueling site setup and/or future fueling site plans, and the communicator 212 may be manufactured and/or updated accordingly.

The remote enterprise server 204 can also have a variety of configurations and functions. For example, in some embodiments, the remote enterprise server 204 can be configured to prompt the electronics module 208 for fuel dispensing data via a communication link 218. While the fuel dispensing data can include a wide variety of information, in some embodiments, as indicated above, the fuel dispenser data can be a challenge code and identity information of a central processing unit (CPU) of the electronics module 208. The remote enterprise server 204 can be configured to receive the fuel dispensing data from the fuel dispenser 202. For example, as shown in FIG. 3, the fuel dispenser 202 can communicate the fuel dispensing data to the remote enterprise server 204 via communication link 210. In addition, the remote enterprise server 204 can be configured to provide a remote password, received from the remote code processor 206, to the electronics module 208 via communication link 218.

As shown in FIG. 3, the remote enterprise server 204 includes a communicator 220. The communicator 220 can generally be configured similar to communicator 212 of the fuel dispenser 202, and therefore communicator 220 can accordingly be configured to facilitate wireless communication over a communication link 218. While the communication link 218 is separate from communication link 210, it is also contemplated that the communicator 212 of the fuel dispenser 202 and the communicator 220 of the remote enterprise server 204 can facilitate wireless communication over the same communication link.

In some embodiments, the remote enterprise server 204 can be configured to receive a command from an external source (i.e., a source external to the system 200) to request that the electronics module 208 provide the fuel dispensing data. In one embodiment, the external source can be a human operator. In another embodiment, the external source can be an electronic device or unit. For example, an external user can determine that maintenance is required, and the external user can communicate with the remote enterprise server 204 to initiate such maintenance.

In other embodiments, the remote enterprise server 204 can be configured to prompt the fuel dispenser 202 for the fuel dispensing data, for example, when the remote enterprise server 204 receives maintenance data (e.g., software upgrades that needs to be installed onto the fuel dispenser) or at the expiration of a predetermined time period. For example, in one embodiment, the remote enterprise server 204 can include a timer. The timer can be an up-counting or down-counting timer, and can further be interrupt driven such that an interrupt is generated upon expiration of the timer. The timer can be configured to start and/or end upon actuation of a specific event, e.g., the fuel dispenser 202 entering its maintenance mode, or alternatively, the timer can be preprogrammed with predetermined start and end times. The timer can also be configured to reset once the fuel dispenser 202 has entered it maintenance mode or in other instances, such as upon the termination of maintenance operation(s) on the fuel dispenser 202 or upon the installation or reinstallation of the fuel dispenser 202.

In some embodiments, the remote enterprise server 204 can also be configured to transmit instructions to the electronics module 208 to cause the electronics module 208 to perform at least one maintenance operation on the fuel dispenser 202 during the maintenance mode. For example, in one embodiment, while the fuel dispenser 202 is in maintenance mode, the remote enterprise server 204 can communicate instructions to the electronics module 208 via the communication link 218, thereby causing the electronics module 208 to run one or more repairs and/or diagnostics on the fuel dispenser 202. In another embodiment, the remote enterprise server 204 can transmit software updates to the electronics module 208.

Further, as shown in FIG. 3, the remote enterprise server 204 is also in communication with the remote code processor 206 via communication link 222. As such, the remote enterprise server 204 can be configured to transmit the fuel dispensing data to the remote code processor 206. Once the remote enterprise server 204 receives the fuel dispensing data from the fuel dispenser 202, the remote enterprise server 204 can therefore transmit the data to the remote code processor 206 such that a remote password can be calculated and communicated to the electronics module 208 of the fuel dispenser 202. The remote code processor 206 can therefore be configured to receive the fuel dispensing data from the remote enterprise server 204, to determine the remote password based on the received data using the same mathematical procedure or formula that is used by the data processor 216 to determine the authorization password, and to provide the remote password to the remote enterprise server 204 via communication link 224.

As shown in FIG. 3, the remote code processor 206 includes a communicator 226. The communicator 226 is generally configured similar to the communicator 220 of the remote enterprise server 204, and therefore the communicator 226 can accordingly be configured to facilitate wireless communication over the communication link 224. While the communication link 224 is separate from the communication link 222, it is also contemplated that the communicator 220 of the remote enterprise server and the communicator 226 of the remote code processor can facilitate wireless communication over the same communication link.

While the remote code processor 206 can include any number of components configured to facilitate data processing, in some embodiments, the remote code processor includes a data processor 228. It is also contemplated that the data processor 228 can include one or more processors forming part of at least one computing system. While the data processor 228 can be configured for various operations, in one exemplary embodiment, the data processor 228 can be configured to determine a remote password based on data characterizing the fuel dispenser 202.

The data processor 228 can include any type of microprocessor or central processing unit (CPU), including programmable general-purpose or special-purpose microprocessors and/or any of a variety of proprietary or commercially-available single or multi-processor systems. The computing system can also include a memory, which provides temporary or permanent storage for computer-executable instructions to be executed by the processor or for data that is processed by the processor. The various elements of the computing system can be coupled to one another, such as with a bus system.

In use, the remote enterprise server 204 prompts the electronics module 208 for data. This data is first transmitted to the remote enterprise server 204, and then transmitted, by the remote enterprise server 204, to the remote code processor 206. The remote code processor 206 uses this data to determine a remote password, which is later transmitted to the remote enterprise server 204 and then to the electronics module 208. During this time, or subsequent thereto, the data processor 216 of the electronics module 208 is using the same data to calculate an authorization password. Once the electronics module 208 receives the remote password and the authorization password is calculated, the data processor 216 compares the passwords and determines whether the passwords match. In instances where the passwords match, the electronics module 208 causes the fuel dispenser 202 to enter maintenance mode. In instances where the passwords are different, the fuel dispenser 202 remains in non-maintenance mode, in which case, it may be desirable to run the foregoing steps again.

FIG. 4 illustrates one exemplary embodiment of a method 300 for prompting a maintenance mode of a fuel dispenser. The method 300 is described with respect to system 200 in FIG. 3, however, a person of ordinary skill in the art will appreciate that the method 300 can be similarly used with other systems and other fuel dispensers.

The method 300 includes the authorization password being calculated 310, e.g., by the electronics module 208, based on data characterizing the fuel dispenser 202. In an exemplary embodiment, the fuel dispensing data can include a challenge code and identity information of a central processing unit (CPU) board of the electronics module. In some embodiments, the method 300 can also include the generation of the fuel dispensing data, e.g., by the electronics module 208. It is also contemplated that the authorization password can be calculated at other times during the method 300, and therefore does not necessarily have to occur in the sequential order illustrated in FIG. 4.

The fuel dispensing data is transmitted 320, e.g., by the electronics module 208, to the remote enterprise server 204. That is, the fuel dispensing data can be transmitted 320 to the remote enterprise server 204 via communication link 210. Once the remote enterprise server 204 receives the fuel dispensing data, the data can then be transmitted 330 to the remote code processor 206, e.g., by the remote enterprise server 204. As such, the fuel dispensing data can be transmitted 330 to the remote code processor 206 via communication 222.

In response to the remote code processor 206 receiving the fuel dispensing data, the remote code processor 206 generates and transmits 340 a remote password to the remote enterprise server 204. That is, the remote password can be transmitted 340 to the remote enterprise server 204 via communication link 224. In some embodiments, the remote password can be based on the received fuel dispenser data. In response to receiving the remote password, the remote enterprise server 204 transmits 350 the remote password to the electronics module 208. That is, the remote password can be transmitted 350 to the electronics module 208 via communication link 218.

Once the electronics module 204 receives the remote password, the data processor 216 compares 350 the remote password to the authorization password. If data processor 216 determines that the passwords match, the fuel dispenser 202 enters 370A a maintenance mode. If the data processor determines the passwords do not match, the fuel dispenser 202 remains 370B in a non-maintenance mode. In some embodiments, the method 300 can also include performing one or more maintenance operations on the fuel dispenser 202 during the maintenance mode.

In some embodiments, the method 300 can also include receiving, e.g., by the electronics module 208, data that includes a request from the remote enterprise server 204 to provide the fuel dispenser data. In other embodiments, the method 300 can also include prompting, e.g., by the enterprise server 204, the fuel dispenser 202 for the fuel dispensing data at the expiration of a predetermined time period.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing system (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and system of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

Certain exemplary embodiments are described to provide an overall understanding of the principles of the structure, function, manufacture, and use of the systems and methods disclosed herein. One or more examples of these embodiments are illustrated in the accompanying drawings. Those skilled in the art will understand that the systems and methods specifically described herein and illustrated in the accompanying drawings are non-limiting exemplary embodiments and that the scope of the present invention is defined solely by the claims. The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Accordingly, the invention is not to be limited by what has been particularly shown and described, except as indicated by the appended claims.

Further, in the present disclosure, like-named components of the embodiments generally have similar features, and thus within a particular embodiment each feature of each like-named component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape. Sizes and shapes of the systems and devices, and the components thereof, can depend at least on the anatomy of the subject in which the systems and devices will be used, the size and shape of components with which the systems and devices will be used, and the methods and procedures in which the systems and devices will be used. Like reference symbols in the various drawings indicate like elements.

All publications and references cited herein are expressly incorporated herein by reference in their entirety. Any patent, publication, or information, in whole or in part, that is said to be incorporated by reference herein is incorporated herein only to the extent that the incorporated material does not conflict with existing definitions, statements, or other disclosure material set forth in this document. As such the disclosure as explicitly set forth herein supersedes any conflicting material incorporated herein by reference.

What is claimed is:

1. A system for controlling maintenance of a fuel dispenser, comprising:
   a fuel dispenser comprising a housing having fuel dispensing components disposed therein and an electronics module disposed at least partially therein, the electronics module including a data processor configured to generate an authorization password based on fuel dispenser data characterizing the fuel dispenser, to receive a remote password, to determine that the remote password matches the authorization password, and to cause the fuel dispenser to enter a maintenance mode;
   a remote enterprise server in communication with the electronics module, the remote enterprise server being configured to prompt the electronics module for the fuel dispenser data and to receive the fuel dispenser data from the fuel dispenser, and to provide the remote password to the electronics module of the fuel dispenser; and
   a remote code processor in communication with the remote enterprise server, the remote code processor being configured to receive the fuel dispenser data from the remote enterprise server, to generate the remote password based on the received fuel dispenser data, and to provide the remote password to the remote enterprise server.

2. The system of claim 1, wherein the fuel dispenser data comprises a challenge code and identity information of a central processing unit (CPU) of the electronics module.

3. The system of claim 1, wherein the remote enterprise server receives a command from an external source to request that the electronics module provide the fuel dispenser data.

4. The system of claim 3, wherein the electronics module provides different fuel dispenser data for each request received.

5. The system of claim 1, wherein the electronics module is adapted to prevent the fuel dispenser from entering maintenance mode prior to the data processor determining that the remote password matches the authorization password.

6. The system of claim 1, wherein the electronics module is adapted to receive a request and to cause the fuel dispenser to exit the maintenance mode.

7. The system of claim 1, wherein the enterprise server is configured to prompt the fuel dispenser for the fuel dispenser data at the expiration of a predetermined time period.

8. The system of claim 1, wherein the remote enterprise server is configured to transmit instructions to the electronics module to cause the electronics module to perform at least one maintenance operation on the fuel dispenser during the maintenance mode.

9. A processing system, comprising:
a data processing unit configured to be at least partially housed in a fuel dispenser and configured to generate and transmit data characterizing the fuel dispenser and to determine an authorization password based on the fuel dispenser data;
a remote enterprise server configured to receive a command to prompt the data processing unit to provide the fuel dispenser data and configured to transmit a request to the data processing unit for the fuel dispenser data and to receive the fuel dispenser data; and
a remote code processor configured to receive the fuel dispenser data from the enterprise server, generate a remote password based on the received fuel dispenser data, and provide the remote password to the enterprise server;
wherein the enterprise server is configured to receive the remote password and provide the remote password to the data processing unit; and
wherein the data processing unit is configured to determine whether the remote password matches the authorization password.

10. The system of claim 9, wherein the data processing unit is configured to cause the fuel dispenser to enter a maintenance mode if the remote password matches the authorization password.

11. The system of claim 9, wherein, when the data processing unit determines that the remote password matches the authorization password, the data processing unit is configured to cause the fuel dispenser to enter a maintenance mode.

12. The system of claim 9, wherein the fuel dispenser data comprises a challenge code and identity information of a central processing unit (CPU) of the data processing unit.

13. The system of claim 9, wherein the data processing unit is configured to provide different fuel dispenser data for each request received.

14. The system of claim 9, wherein the data processing unit is configured to prevent a fuel dispenser from entering a maintenance mode prior to the data processor determining that the remote password matches the authorization password.

15. The system of claim 9, wherein the data processing unit is configured to receive a request and to cause a fuel dispenser to exit the maintenance mode.

16. The system of claim 9, wherein the remote enterprise server is configured to transmit instructions to the data processing unit to cause the data processing unit to perform at least one maintenance operation on a fuel dispenser during the maintenance mode.

17. A method for prompting a maintenance mode of a fuel dispenser, the method comprising:
generating, by an electronics module comprising a data processor and that is at least partially housed in a fuel dispenser, an authorization password based on data characterizing the fuel dispenser;
transmitting, by the electronics module, the fuel dispenser data to an enterprise server that is in communication with the electronics module;
receiving, by the enterprise server, the fuel dispenser data;
transmitting, by the enterprise server, the fuel dispenser data to a code processor that is in communication with the enterprise server;
generating, by the code processor, a remote password based on the received fuel dispenser data;
transmitting, by the code processor, a remote password based on the received fuel dispenser data to the enterprise server;
receiving, by the enterprise server, the remote password;
transmitting, by the enterprise server, the remote password to the data processor of the electronics module;
determining, by the data processor, that the remote password matches the authorization password; and
causing the fuel dispenser to enter the maintenance mode.

18. The method of claim 17, further comprising generating, by the electronics module, the fuel dispenser data that includes a challenge code and identity information of a central processing unit (CPU) board of the electronics module.

19. The method of claim 17, further comprising receiving, by the electronics module, data comprising a request from the enterprise server to provide the fuel dispenser data.

20. The method of claim 17, further comprising prompting, by the enterprise server, the fuel dispenser for the fuel dispenser data at the expiration of a predetermined time period.

21. The method of claim 17, further comprising performing one or more maintenance operations on the fuel dispenser during the maintenance mode.

* * * * *